Patented June 14, 1949

2,473,493

UNITED STATES PATENT OFFICE 2,473,493

STABILIZING EVAPORATED MILK

Herbert E. Otting, Westerville, and Lewis H. Chrysler and Emory F. Almy, Columbus, Ohio, assignors to M & R Dietetic Laboratories, Inc., a corporation of Ohio No Drawing. Application September 11, 1946, Serial No. 696,360

11 Claims. (Cl. 99—55)

The present invention relates to improvements in the processing of fluid milk products and more particularly to the stabilization of the milk product against the effects of high temperatures applied during the process of manufacture.

In the processing of fluid milk products to secure products of relatively high total solids content, the fluid milk, skim milk or other fluid milk solids-containing material is frequently subjected to high temperatures at certain stages to effect evaporation or sterilization or for other purposes. In many such operations the milk or milk solids-containing liquid is subjected to temperatures exceeding 150° F., and for sterilizing purposes to temperatures as high as 220 to 270° F. or higher for considerable periods of time before or after the evaporating or concentrating step in which the solids content of the milk products is increased. The high temperatures to which the fluid milk solids-containing material is subjected in such operations causes an increase in viscosity of the final fluid product which in many cases is excessive and tends to cause coagulation or curd formation in the final product. The increase in viscosity to a certain extent may in some cases be desirable, as, for example, in the manufacture of evaporated (unsweetened) milk. Coagulation and curd formation are in all cases undesirable. However, the extent of increase in viscosity and whether or not curd formation will occur are variable and unpredictable, and appear to depend upon many factors beyond the control of the processor; for example, the season of the year, the feed supplied to the cattle, the nature and analysis of the soil on which the cattle are pastured, and the like.

The present invention is addressed to the control and stabilization of the effects of high heat treatment of milk solids-containing fluids, such as whole milk, skim milk and the like, and more particularly to the control and stabilization of the viscosity and curd-forming or coagulating effects. The invention will be fully understood from the following description, in which various illustrative examples of its use are set forth.

In the manufacture of evaporated milk, for example, four principal steps are involved in which heat is employed, these being the forewarming, the evaporation step proper, homogenization and the final sterilization.

In the forewarming preceding the evaporation, the temperatures ordinarily employed are in the range from 180° to 212° F., although occasionally higher temperatures, up to about 235° F. may be employed by keeping the milk under pressure. Since the milk may be held at the selected temperature for as much as 15 to 20 minutes, at higher temperatures the color and flavor of the milk may be affected, and cooking of milk solids on the heated surfaces may take place. The primary purpose of the forewarming step is to preheat the milk before it enters the evaporator although, as pointed out hereinatfer, other purposes may also be served.

The evaporation step is usually conducted at temperatures in the order of 120° to 180° F. under reduced pressure so that boiling occurs. The length of time required for the evaporation step depends upon the initial total solids content of the milk subjected to treatment and the desired total solids content of the final product. In American practice, the minimum total solids standard for evaporated milk is about 26% (25.9%). In other countries in some cases the standard is higher; for example, in England the standard is 31.25% total solids, and for export purposes, a total solids content of 32 to 34% may be desirable. In general the milk is slightly over-concentrated in the evaporator and then adjusted to the standard or slightly thereover by the addition of potable water, fresh milk and the like, prior to sterilization. Occasionally cream must be added to bring the fat content to standard, which is 7.9% in American practice and higher where higher total solids standards prevail. For example, in England the standard for fat content is 9.25%.

Following the evaporation step and any necessary adjustment of the milk to the prevailing standards, the evaporated milk is homogenized. As is usual in such operation, the temperature may be in the order of 120° to 150° and the pressure in the order of 2,000 to 3,000 pounds. A typical set of conditions is 3,000 pounds pressure at 135° F.

The evaporated and homogenized milk is then sterilized at temperatures varying from about 220° to about 270° F. The sterilization is usually carried out after the milk has been canned, although in some plants the evaporated milk is sterilized and subsequently canned in sterile cans. The time required for sterilization will vary according to the temperature employed, in order to secure sterility and for certain other effects as hereinafter pointed out, such as control of viscosity. In general the time at sterilizing temperature may range from 12 to 20 minutes with temperatures from about 220° F. to about 250° F., approximately a similar length of time being required for bringing the milk up to temperature and for cooling the milk after sterilization. With higher temperatures, say in the order of 260° to 270° F., very short times at the sterilizing temperatures are employed.

In conducting the series of steps above referred to, in addition to securing a sterile milk product of the desired total solids content, various other desiderata enter into the process. One is the maintenance, as far as possible, of uniformity of fat distribution in the final product, this being aided by the homogenization step. It is also necessary that a sufficient body or viscosity be secured in the final product to aid in preventing settling out of fat particles. Too high a viscosity is undesirable, since the product should be creamy, but not excessively thick. The viscosity, when freshly produced, may be in the range of 75 to 450 seconds at 60° F., as determined by the standard type of viscosimeter used for the purpose, known as the Borden flow meter, and preferably in the neighborhood of 250 to 350 seconds. The body or viscosity of the final product is to a large extent dependent upon the temperatures and times used in the sterilizing operation, higher temperatures and longer times tending to increase the viscosity of the product.

In the commercial conduct of the process, the most serious problem encountered is the maintenance of the stability of the milk while securing sterility and the desired viscosity, body and flavor; that is, the prevention of the formation of curds or flocks completely or, if any appear, which do not dissipate themselves on mere agitation of the final product. This instability arises out of the heat treatment which the milk receives, particularly in the sterilizing step, and is an almost constant problem to the commercial operator. The degree of stability or instability of the milk in the processing varies not only with individual cows and herds from which the milk is secured, but also with seasons, types of feed and character of pasturage available. Thus, in processing milk to the American standard, in only part of the early summer in some areas is the milk sufficiently stable to be processed without special treatment, a greater or lesser degree of instability being present during all other parts of the year; and when processing to the higher European standards of total solids content, such as the British, the milk almost invariably requires special treatment to make it stable during processing.

In general, varying additions of certain salts are made to the milk at some time during the processing prior to sterilization, preferably prior to the forewarming step. The permissible salts which may be employed for this purpose are certain "naturally occurring" salts, such as sodium bicarbonate, sodium citrate and disodium phosphate. Since the precise degree of instability of a batch of milk being procesed, which may be as much as 60,000 to 100,000 pounds, is unpredictable, it is the practice commercially to make a pilot test on small portions from each batch of milk, to which varying additions of one of the permissible salts are made and the resulting batches put through a pilot sterilizer which duplicates the performance of the large scale sterilizer used by the particular plant. From the behavior of these pilot samples, the proportion of added salt, if any, required to secure stability in the processing is determined. Thus, referring to disodium phosphate as the salt used (in the form of the heptahydrate), it may be found that in the summer months, during the early period of pasturage in the midwest section, from 0 to 5 ounces of the salt may be required per thousand pounds of evaporated milk, whereas in the winter the requirement may rise to 10 to 15 ounces per thousand pounds concentrated milk, or higher. This has reference to milk evaporated to the American standard of 25.9% total solids or slightly higher. Higher proportions of added salt are needed if a higher total solids content is desired; for example, milk stable without salt addition for concentration to about 26% total solids may require as much as 48 to 50 ounces per thousand pounds if it is to be brought to a total solids content of 32 to 34%.

There are certain interrelations between the steps in the process which introduce difficulties into its proper conduct. Other conditions being the same, the proportion of added salt used with a given batch of milk must be held within fairly close range, since under-correction or over-correction will result in curd formation or graininess, apart from undesirable effects on viscosity. The stability in the sterilizing step may be increased by the use of higher temperatures in the forewarming step, but here again the temperature or the extent to which the forewarming may be carried must be kept within close upper limits or a sharp break may occur in the sterilizing operation with curd formation or graininess in the final product. Furthermore, the extent of the correction which may be secured in the forewarmer by the use of high temperatures or long times of heating is limited because of the injury to taste, flavor and color of the milk which may occur there.

In the manufacture of sweetened condensed milk, both whole and skim, the high temperature heat treatment necessary, involving temperatures in excess of 150° F., likewise gives rise to instability of the product, showing in a gradual physical thickening of the product in the cans or containers over even short periods of time. As a result, the concentration of the milk fluid may not be carried to as high a total milk solids content as is desirable, particularly in the case of condensed sweetened skim milk.

Similarly, in the preparation of lactose, sucrose is added to skim milk, the mixture heated and then concentrated to a high total solids content of, say, 58 to 60%, and lactose then crystallized out. In the process temperatures up to 150° F. and higher are used in the forwarming and evaporating steps. When too high a viscosity is developed in the concentrated product, the crystallization and separation of the lactose are seriously interfered with.

In accordance with the present invention the control of viscosity and stabilization of the fluid milk product in the evaporating or concentrating process toward the high temperatures used, in excess of about 150° F., is effected by the use of mineral modified milk or milk solids as hereinafter set forth. The mineral modified milk solids may be fat-containing or fat-free, and thus may be derived from whole or skim milk. In preparing such mineral modified milk solids, the modification is effected by ion exchange, preferably by cation exchange with the solids contained in normal whole or skim milk. Only small proportions of the modified milk solids need be employed to stabilize the fluid milk product against the viscosity and curd-forming coagulating effects resulting from the high temperatures employed in processing. In the use of the present invention, any small proportion of flocks that may form in the evaporated milk product as a result of sterilizing or other high temperature steps disappear promptly on agitation or shaking. Likewise, when using the present invention to effect the viscosity control and stabilization of the milk product, no permanent coating is formed on the walls of the cans such as develops in some types of sterilizers without continuous agitation when using a salt correction.

In carrying out the present invention, modified milk or milk solids are suitably produced by cation exchange with suitable exchange material, preferably in the sodium cycle. The exchange material employed may be of the resin type such as are described, for example, in Industrial and Engineering Chemistry, 1941, vol. 33, pages 697 et seq. and known as Amberlite resins; or of the carbonaceous or sulfonated carbonaceous type, or in some cases of the mineral or zeolitic type. Typical cation exchangers which may be employed are for example, the commercial cation exchange materials such as IR-100, ZeoKarb, Catex and the like. Exchange materials of the mineral or zeolitic type, for use in carrying out the present invention, require special activation or regeneration procedures to increase their effectiveness in cation removal relative to anion removal.

In the use of such cation exchangers, regeneration is suitably effected by means of sodium chloride solution after prior treatment with alkali such as soda ash or sodium hydroxide, a wetting agent being preferably employed as set forth in the U. S. Patent to Hull, No. 2,346,844, granted April 18, 1944, where the exchange material has previously been used in the treatment of whole milk. Instead of regenerating with sodium chloride solution, the regeneration may be effected with a dilute solution of hydrochloric acid followed by a solution containing sodium chloride and a small proportion of sodium hydroxide. After regeneration or, if fresh, after an initial treatment wtih sodium chloride solution, the exchange material is washed with water until the sodium chloride content of the effluent is reduced, preferably to not more than 30 grains per gallon, at which time the exchange material may be used for the treatment of the whole milk or skim milk used as the source of the modified milk solids. If desired, the milk or skim milk may be slightly acidified to increase the effectiveness of the calcium removal. The treatment is so conducted as to reduce the ratio of calcium (as Ca) to phosphorus (as P) in the solids of the treated milk to a range from about 0.15 to about 0.75, and preferably from 0.25 to about 0.6, this reduction being accompanied by an increase in pH. The reduction is primarily in the calcium, the phosphorus being removed to a substantially less extent, in contradistinction to the prior known treatments of milk fluids with mineral base exchangers in which both calcium and phosphorus are removed to a substantial extent to reduce the curd tension of the milk. Since the non-fat solids are primarily concerned in effecting the desired stabilization, the milk treated may be either whole or skim milk.

This increase in pH may be such that the pH of the treated milk is in the order of 7.4 to 8.6, and it may be desirable to reduce this pH to a point within the range commonly found in fresh whole or skim milk, say from 6.65 to 6.90. This may be effected by the addition of a suitable acid, such as hydrochloric acid, acetice acid, citric acid, or the like, or preferably by the use of cation exchange materials of the types previously referred to, in the hydrogen or acid cycle. Thus the exchange material employed, for example, IR-100, is contacted with a dilute hydrochloric acid solution for a considerable period of time, say 30 minutes, the acid solution removed and the free acid washed out. This acid exchange material may then be agitated in suitable proportions with the treated milk to reduce the pH of the latter to the desired point. In this way the reduction of the pH of the treated milk may be effected without increasing its salt content, as would be the case if acid were employed for the purpose.

Where the pH of the treated milk or skim milk is not excessive; say for example where it does not exceed 7.5 to 8 or thereabout, it is not necessary to apply to it the treatment with the acid exchange material to reduce its pH, and it, or the solids derived from it, may be employed directly in the present process.

The following examples illustrate the preparation of a fluid milk in order to secure the mineral modified milk solids of low calcium to phosphorus ratio, as used in accordance with the present invention. Either whole milk or skim milk may be employed. For purposes of illustration, the exchange material employed is the resinous cation exchange material commonly known as IR-100 although, as is readily apparent, other resinous or mineral cation exchange materials may be employed. Where calcium to phosphorus ratio is referred to herein, it is to be understood that calcium is expressed as Ca and phosphorus as P.

In some cases, the exchange material, when freshly procured, is in the hydrogen or acid cycle, and this is changed to the sodium cycle by washing it with a 5% sodium chloride solution containing sufficient sodium hydroxide to give an alkaline end point to phenolphthalein by the time the treating solution has passed through the bed. Usually a suitable alkalinity is secured if sufficient sodium hydroxide is added to the sodium chloride solution so that on titration of 10 cc. of the latter with N/10 hydrochloric acid, 1 cc. of the acid will neutralize it. After the treatment, the exchange material in the bed is washed with water until the sodium chloride content of the effluent is not more than 30 grains per gallon, whereupon the milk or skim milk may be passed through the bed of exchange material.

For the treatment of the milk, which may be whole or skim milk, either raw or pasteurized, it is found that 1.25 to 1.50 cubic feet of the exchange material to each 12 to 14 inches depth of bed for each 30 gallons of milk to be processed is sufficient when a pH of about 8 is secured on the treated milk. More of the fluid milk may be treated with the same amount of exchange material, but the relative percentage of calcium removal on the total treated product will be lower and the pH will move toward the acid side. A suitable rate of flow through the bed of exchange material is three minutes per gallon. Ordinarily a small amount of the wash water remains in the exchange material and this causes a slight dilution of the treated milk.

After the exchange material has been prepared, the milk is passed through it at the rate above mentioned and in general, a calcium to phosphorus ratio of the treated milk of about 0.4 to 0.6 is secured. By using a larger proportion of exchange material based on the milk treated or by slightly acidifying the milk prior to treatment, suitably with hydrochloric acid, lactic acid or citric acid, or by various combinations thereof, a higher relative proportion of the calicum may be removed; or alternatively, if the same over all proportion of calcium removal is desired, a larger amount of milk may be treated per cubic foot of exchange material. Thus by preliminarily acidifying the milk before treatment with the exchange material, say to a pH of about 6.10 or lower, a larger amount of milk, ranging from about 20 to about 45% greater, may be treated, per cubic foot of exchange material, securing very closely the same calcium to phosphorus ratio in the treated product. In carrying out the present invention the treatment with the exchange material is controlled to secure in the solids of the treated whole or skim milk a calcium to phosphorus ratio of from 0.15 to 0.75 and preferably from 0.25 to 0.6.

In a typical operation, using 1.36 cubic feet of the exchange material per 14 inch depth of bed to about each 50 gallons of milk treated, the fresh whole milk treated had a total solids content of 12.66%, a pH of 6.72 and a calcium to phosphorus ratio of 1.155. After treatment, the treated product had a total solids content of 10.22%, a pH of 7.43 and a calcium to phosphorus ratio of 0.547.

In another case, the fresh whole milk had a pH of 6.67 and a calcium to phosphorus ratio of 1.137. In this case the fresh milk was treated with citric acid to bring its acidity to 0.24% (calculated as lactic acid) and its pH to 6.08. It was then passed through the cation exchange material, the conditions being similar to those of the preceding example, except that in this case approximately 73 gallons of the milk were treated per 1.36 cubic feet of the exchange material. The pH of the product was 7.92 and the calcium to phosphorus ratio was 0.429.

If desired, the pH of the treated milk may be reduced after the treatment with the ion exchange material, for example, by agitation with cation exchange materials such as those previously described, in the hydrogen cycle. The exchange material may be placed in the hydrogen cycle by simple agitation with dilute acid, for example, dilute hydrochloric acid, and washing out the free acid.

As is readily apparent, by varying the relative proportion of the milk or skim milk treated per unit volume of the exchange material, the calcium to phosphorus ratio in the final product may be varied as desired.

In revivifying the exchange material after having been contacted with the whole milk or skim milk, it may suitably be washed first with warm water; then with a solution made alkaline with soda ash and containing a wetting agent, such as those referred to in the patent to Hull, above referred to, and then again washed with warm water. It may then be regenerated with a dilute solution of sodium chloride in the usual manner.

Where the milk under treatment has been skim milk, the wash with alkali solution containing a wetting agent may be dispensed with. A suitable method of revivifying in such case is first to wash the exchange material with water; then with dilute hydrochloric acid in solution and again with water until the wash water no longer has an acid taste. It is then revivified by passing a slightly alkaline salt solution through the bed of exchange material, a suitable solution being one containing 0.5 pound of sodium chloride and .013 pound of sodium hydroxide per gallon. The bed of exchange material is then washed until the sodium chloride content of the effluent is reduced to not over 30 grains per gallon.

In carrying out the present invention, modified milk solids having a low calcium to phosphorus ratio as above set forth are admixed in small proportions with the milk being subjected to the evaporation processing steps at some time prior to the final high temperature treatment or sterilization. The modified milk solids may be added either in the form of the modified milk (whole or skim), or the modified milk may be evaporated to a desired total solids content suitably approximately the milk solids content desired in the final product, say 25.9% to 34%; or it may be dried to solids, suitably by evaporation followed by spray drying. As will be apparent, the non-fat milk solids are the essential constituents in the material added for control and stabilization purposes, and the calcium to phosphorus ratio of the salts therein may vary from 0.15 to 0.75 and preferably from 0.25 to 0.6, as hereinbefore set forth.

The treated milk product, particularly when in the form of an evaporated product or as dried solids, may be prepared and packaged in the same manner as are analogous milk products and transported and utilized as desired. The addition of the modified milk solids material may be made at any suitable point in the processing; for example, in preparing evaporated milk, in the forewarmer, or to the evaporated milk between the evaporator and the homogenizer. It may also be added between the homogenizer and the sterilizer but as is readily apparent, it is preferable to add it prior to the homogenizer since the latter aids in its mixing with the main body of milk or milk product undergoing processing with the added modified milk solids or milk solids containing material.

When added prior to the concentrating or evaporating step, the modified milk solids may be added either in the form of the modified milk fluid, or evaporated modified milk fluid or as the dried solids therefrom. It has been found preferable to make the addition at or prior to the forewarmer. When added at this point, approximately one-half as much of the modified milk solids are needed as when added subsequent to the evaporating or concentrating step and prior to the sterilizing step. When added after the evaporating or concentrating step, the modified milk solids are added in the form of the evaporated modified milk fluid or as dried solids. In operating in accordance with the present invention the calcium and phosphorus contents of the product are but very slightly affected and remain well within the normal range of variations of untreated milk.

The proportion of the modified milk solids necessary for stabilizing varies in the range from 0.25% to 5%, based on total milk solids content of the mixture. Somewhat higher proportions, say up to about 7 or 8% or even higher may be used, if desired, particularly when the calcium:phosphorus ratio is in the higher portion of the range indicated. In general, when the final product is to meet the American standard of 25.9% total solids, not over 2.5% (basis total solids) of the mineral modified milk solids is required; but when the higher European standards in the order of 32 to 34% total solids are to be met in the final product, proportions up 5% (basis total solids) may be required.

The modified milk solids may, if desired, be substantially fat free and may be secured by treatment of skim milk. In case such fat free material is used, either in the form of modified skim milk, or concentrated modified skim milk or the dried solids therefrom the proportion of such modified solids included is so small that in most cases the proportion of fat in the final product will be up to standard. If not, the fat content of the final product may be adjusted prior to the sterilizing step, as is the customary practice at the present time.

The following examples are illustrative of the invention.

Example 1

The whole milk being processed was one which, in following the customary practice, was found to require 7.3 ounces of disodium phosphate per thousand pounds of evaporated milk for stabilization in the sterilizing step. It had a pH of 6.72, and its solids showed a calcium to phosphorus ratio of 1.155. The modified milk employed was a whole milk subjected to cation exchange treatment as above described, without having its pH subsequently reduced. It had a pH of 7.43 and a calcium to phosphorus ratio of 0.547. It was concentrated to 26% total solids.

The untreated milk, with 7.3 ounces of disodium phosphate, gave a product of fairly heavy viscosity when sterilized at 240° F., taking 15 minutes to come up to temperature and with 15 minutes holding time.

The same milk, without the added salt for correction, after concentration to 26% total solids, was mixed with the concentrated modified whole milk above referred to in quantities sufficient to provide 2.5% of the latter in the mixture. Since the total solid contents of the two concentrated milk products were the same, this gave substantially 2.5% of the modified milk total solids, basis total solids of the whole. After sterilizing under the same conditions the product had a heavy smooth body, without curd formation and with normal color and flavor. To determine the effects of over-correction, additions of 5 to 20% of the concentrated modified milk were made prior to sterilization. With such larger additions, very low viscosities of the product were secured but in no case was there any indication of curd formation. The addition of the concentrated modified milk did not materially affect the pH of the concentrated product. Thus, the pH of the untreated milk after concentration to 26% total solids was 6.31. With the addition of 2.5% of the concentrated modified milk, the pH of the mixture was 6.34; and with 5% addition, the pH of the mixture was 6.36.

Example 2

The untreated fluid milk to be concentrated in this case had a total solids content of 11.44%, a calcium to phosphorus ratio of 1.187 and a pH of 6.78. When processed in the usual manner, it was found to require 15.7 ounces of disodium phosphate per thousand pounds of evaporated milk, the sterilization being conducted under the conditions hereinbefore set forth. This produced a viscous, heavy but smooth evaporated product.

In applying the present invention without using the added salt for correction, a mineral modified whole milk was prepared by cation exchange as above described, without subsequent pH adjustment. This modified milk had a total solids content of 10.79%, a calcium to phosphorus ratio of 0.282 and a pH of 8.57. In this case the mineral modified milk was admixed with the milk to be concentrated prior to forewarming. The mixture contained 2.5% of the modified milk. The mixture was subjected to 203° F. for 15 minutes in the forewarmer, and then concentrated to slightly over 26.28% solids in the evaporator at 120° to 140°. It was homogenized under 3,000 pounds pressure at 130° F. and sterilized under the same conditions as are set forth in Example No. 1. The resulting product had a satisfactory medium heavy body, and showed no curd formation or instability.

Using the same milk and modified milk, concentrating them separately and mixing them prior to sterilizing, 5% of the concentrated modified milk gave a satisfactory product.

Example 3

This example illustrates the production of a milk concentrated to a total solids content of 34%. The fresh milk selected was one which was found to process satisfactorily to slightly over 26% total solids without salt correction, the forewarming being conducted at 190° F. for 15 minutes and the sterilizing step at 240° F. for 15 minutes with 15 minutes for coming up to temperature. When processed to 34% total solids without salt correction, however, it coagulated badly. 36 ounces of disodium phosphate per thousand pounds of concentrated milk were required for correction in concentrating to 34% total solids under these conditions, producing a smooth product with a viscosity (fresh) of 405 seconds. (Viscosities given are at 60° F. with the Borden flowmeter.)

When this milk was treated before forewarming by the addition of dried solids from cation exchanged skim milk having a calcium to phosphorus ratio of 0.435 in quantity sufficient to provide 5% of the treated skim milk solids (basis total solids), and processed under the same conditions to produce a product of 34% total solids content, the product was entirely satisfactory, having a smooth texture and a viscosity of 443 seconds.

In a similar operation in which the fluid milk employed processed satisfactorily to the American standard but coagulated badly when processed to 32% and 34% total solids content, the forewarming temperature being 203° F. and the sterilizing temperature 244° F., the addition prior to forewarming of 5% of dried solids from cation exchange treated skim milk (basis total solids) having a calcium to phosphorus ratio of 0.435 resulted in a satisfactory product at 32% total solids, having a smooth texture and viscosity of 326. At 34% the product had a viscosity somewhat in excess of 450 seconds and contained a few small flakes which, however, dissolved or dissipated themselves on agitation, forming a smooth and fairly satisfactory product.

Example 4

In this operation, the milk selected processed satisfactory to the American standard without salt correction, but on concentration to 34% total solids, coagulated badly. The forewarming conditions were 203° F. for 15 minutes and the sterilizing conditions 240° with 15 minutes coming up to temperature and 15 minutes at temperature. When corrected with 46.8 ounces of disodium phosphate per thousand pounds of concentrated milk, on processing to 32% total solids a satisfactory product was secured with a smooth texture and a viscosity of 378 seconds. At 34% total solids the viscosity was in excess of 450 seconds.

The same milk was treated prior to forewarming by the addition of dried solids from cation exchange treated skim milk having a calcium to phosphorus ratio of 0.435. When processed under the same conditions to 32% total solids content, a satisfactory product was secured having a smooth texture and a viscosity of 323 seconds. When processed to 34% total solids, the product was satisfactory and had a smooth texture and a viscosity somewhat over 450 seconds. No curd formation occurred in either case.

As is readily apparent from the above examples, by using modified milk solids which have been reduced to lower calcium to phosphorus ratios than those specifically referred to, somewhat smaller proportions of the modified milk solids may be employed relative to the total milk solids in the mixture. As hereinbefore set forth, the treatment of the whole or skim milk with the exchange material may result in a treated milk in which the calcium to phosphorus ratio ranges from about 0.15 to about 0.75, and from 0.25% to 5% of the modified milk solids, basis total solids, may be employed.

In the preparation of sweetened condensed milk, either whole or skim, it is sometimes desirable to have a thin or low viscosity body in the product at the time of manufacture. As now manufactured, a desirable body may be secured, but physical thickening takes place after manufacture, in the cans or containers during storage or on the shelves of the merchandiser, this thickening being accentuated in the warmer seasons or in tropical and semi-tropical countries. Such physical thickening of the product is more aggravated in the case of sweetened condensed skim milk. By incorporating the mineral modified milk solids of low calcium to phosphorus ratio as hereinbefore described in proportion to provide from 0.25 to 5% of the total milk solids present, it is found that the initial viscosity of the finished product may be reduced and the attainment of an undesirably high viscosity by thickening is retarded, making the product marketable over greatly increased periods of time. It is likewise possible, if desired, to carry the evaporation or condensation of the product to a higher milk solids content without attaining undesirably high viscosities. The mineral modified milk solids are incorporated before or during the forewarming step. Depending upon the point at which added, as in the treatment of milk in the evaporation process, the mineral modified milk solids may be added in the form of milk, either whole or skim, or vaporated milk or dried milk solids.

In the preparation of delactosed sweetened condensed skim milk, the mineral modified milk solids have also been found valuable in controlling viscosity and preventing instability. In this process, sucrose is added to skim milk, suitably about 100 pounds of sucrose to 1400 pounds of skim milk. The sweetened skim milk is then heated to 150° F. or higher, held for 10 to 15 minutes and then evaporated in vacuo at a temperature below 140° F. to a total solids content of 58 to 60%, the milk solids content being in the order of 30 to 35%. This condensed product is then slowly cooled with agitation and held for 24 to 48 hours, a major proportion of the lactose crystallizing out. In carrying out the process, one difficulty arises from the high viscosity of the sweetened evaporated skim milk, which impedes the crystallization and separation of the lactose. Furthermore, it is desirable to employ a temperature exceeding 150° F. in the forewarning step to secure better pasteurization and lower bacterial count so that the delactosed product will have better keeping qualities and will be safer for use in the preparation of food products. Under the present processes, the use of temperatures exceeding 150° F. are attended with an undue thickening or high viscosity of the product, and with possible curd formation.

By the addition prior to the forewarming step of suitable proportions of the minerl modified milk solids as hereinbefore described, preferably in the form of treated skim milk or its solids, to provide 0.25 to 5% of the total milk solids present, and then carrying out the operation as above described, a much reduced viscosity of the sweetened condensed product is secured, greatly facilitating the crystallization and separation of the lactose. Furthermore, it is possible to use a considerably higher forewarming temperature, say in the order of 180° to 200° F., or to concentrate to a higher total solids content and still secure a viscosity in the sweetened condensed product which will permit the ready crystallization and separation of the lactose, without danger of curd formation.

In the preceding specification the calcium to phosphorus ratio of the cationic exchange treated material in milk solids has been referred to as an indication of the effects resulting from the treatment with the exchange material, but it is not intended thereby that it is the sole result or the only one effective in securing the stabilizing action described herein. It appears that there are other effects resulting from this treatment and to which the stabilization effect hereinbefore described may be due, at least in part. That this is the case is indicated, to some extent at least, by the fact that the calcium to phosphorus ratio in the solids of the final stable product is frequently within the range normal in untreated milk which is unstable when subjected to the heat treatment involved in the processes described above.

Although the present invention has been described in connection with various specific examples illustrating its use, it is not intended that the details of these examples shall be regarded as limitations upon the scope of the invention, except insofar as included in the accompanying claims.

We claim:

1. In the processing of fluid milk products to secure non-solid products containing an increased proportion of milk solids and wherein the fluid milk product under treatment is subjected to temperatures exceeding about 150° F., the method of controlling and stabilizing the viscosity and curd forming effects of the high temperature treatment which comprises incorporating therein a minor proportion of mineral modified milk solids having a calcium to phosphorus ratio in the range from about 0.15 to about 0.75.

2. In the processing of fluid milk products to secure non-solid products containing an increased proportion of milk solids and wherein the fluid milk product under treatment is subjected to temperatures exceeding about 150° F., the method of controlling and stabilizing the viscosity and curd forming effects of the high temperature treatment which comprises incorporating therein mineral modified milk solids having a calcium to phosphorus ratio in the range from about 0.15 to about 0.75 in amount to provide 0.25% to 5% of the total milk solids in the final product.

3. In the processing of fluid milk products wherein the milk product under treatment is concentrated by evaporation to a milk solids content of about 26% or higher and wherein the milk product is subjected to temperatures exceeding about 150° F. during the processing, the method of stabilizing the concentrated product which comprises incorporating into the fluid milk product under treatment during processing and prior to a high temperature treatment stage, mineral modified milk solids having a reduced calcium to phosphorus ratio in the range from about 0.15 to about 0.75 in amount to provide 0.25 to 5% of the total milk solids in the final product.

4. In the preparation of evaporated milk wherein milk is concentrated by evaporation and subsequently subjected to sterilization temperatures of 220° F. and higher, the method of stabilizing the evaporated milk product which comprises incorporating therein prior to the sterilizing step modified milk solids having a reduced calcium to phosphorus ratio in the range from about 0.15 to about 0.75 in amount to provide 0.25 to 5% of the total milk solids in the final product.

5. The method of preparing evaporated milk which comprises forewarming the milk at a temperature in the range from about 180° to about 235° F., concentrating the heated milk by evaporation under vacuum at temperatures not above about 180° F. and subsequently sterilizing the concentrated milk at temperatures in the range from about 220° to about 270° F., and adding to the milk under treatment prior to the sterilizing step from about 0.25% to about 5% (basis total solids) of mineral modified milk solids having a calcium to phosphorus ratio in the range from about 0.15 to 0.75.

6. The process as set forth in claim 5 wherein the mineral modified milk solids are added to the milk being processed subsequent to the evaporating step.

7. The process as set forth in claim 5 wherein the mineral modified milk solids are added to the milk being processed at the forewarming step.

8. In the method of preparing sweetened condensed milk wherein sugar is added to fluid milk, the resulting mixture forewarmed at a temperature not less than about 150° F. and subsequently evaporated under vacuum to concentrate its solid content, the method of stabilizing the viscosity of the product which comprises incorporating in the milk product at the forewarming step from 0.25 to 50% of mineral modified milk solids (basis total milk solids) having a calcium to phosphorus ratio of 0.15 to 0.75.

9. The method as set forth in claim 8 wherein the fluid milk subjected to treatment is skim milk.

10. In the method of preparing delactosed skim milk wherein sucrose is added to skim milk, the mixture forewarmed at a temperature of at least about 150° F. and then evaporated to a total solids content of at least 58 to 60%, and subsequently the lactose crystallized therefrom, the method of controlling the viscosity of the liquid which comprises adding at the forewarming step a minor proportion of mineral modified milk solids having a calcium to phosphorus ratio in the range from about 0.15 to about 0.75.

11. Evaporated fluid milk having a total solids content of 25.9% to 34% and comprising a minor proportion of cation-exchanged non-fat milk solids in which the calcium to phosphorus ratio is from 0.15 to 0.75.

HERBERT E. OTTING.
LEWIS H. CHRYSLER.
EMORY F. ALMY.

REFERENCES CITED

The following references are of record in the file of this patent:

UNITED STATES PATENTS

| Number | Name | Date |
| --- | --- | --- |
| 1,511,808 | Grindrod | Oct. 14, 1924 |
| 2,045,097 | Otting | June 23, 1936 |
| 2,072,903 | Otting et al. | Mar. 9, 1937 |
| 2,102,642 | Otting et al. | Dec. 21, 1937 |
| 2,233,178 | Otting | Feb. 25, 1941 |
| 2,346,844 | Hull | Apr. 18, 1944 |

FOREIGN PATENTS

| Number | Country | Date |
| --- | --- | --- |
| 542,846 | Great Britain | Jan. 29, 1942 |

OTHER REFERENCES

"Condensed Milk and Milk Powder," by O. F. Hunziker, published by the author, La Grange, Illinois, 1926, 4th edition, pages 198 to 212.

"Readjustment of Salts in Milk by Base Exchange Treatment," published in Ind. and Eng. Chemistry, Nov. 1933, pages 1297–1298.

Certificate of Correction

Patent No. 2,473,493.                                                                                          June 14, 1949.

HERBERT E. OTTING ET AL.

It is hereby certified that errors appear in the printed specification of the above numbered patent requiring correction as follows:

Column 8, line 62, for the word "stabilizing" read *stabilization*; line 74, before "5%" insert *to*; column 14, line 3, claim 8, for "50%" read *5%*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*